April 12, 1955

C. W. CANNON 2,706,144

IMPROVED HARGREAVES METHOD FOR MAKING
SULPHATE SALTS AND HCL

Filed Feb. 2, 1950

Inventor
Curtis W. Cannon

By
Attorney.

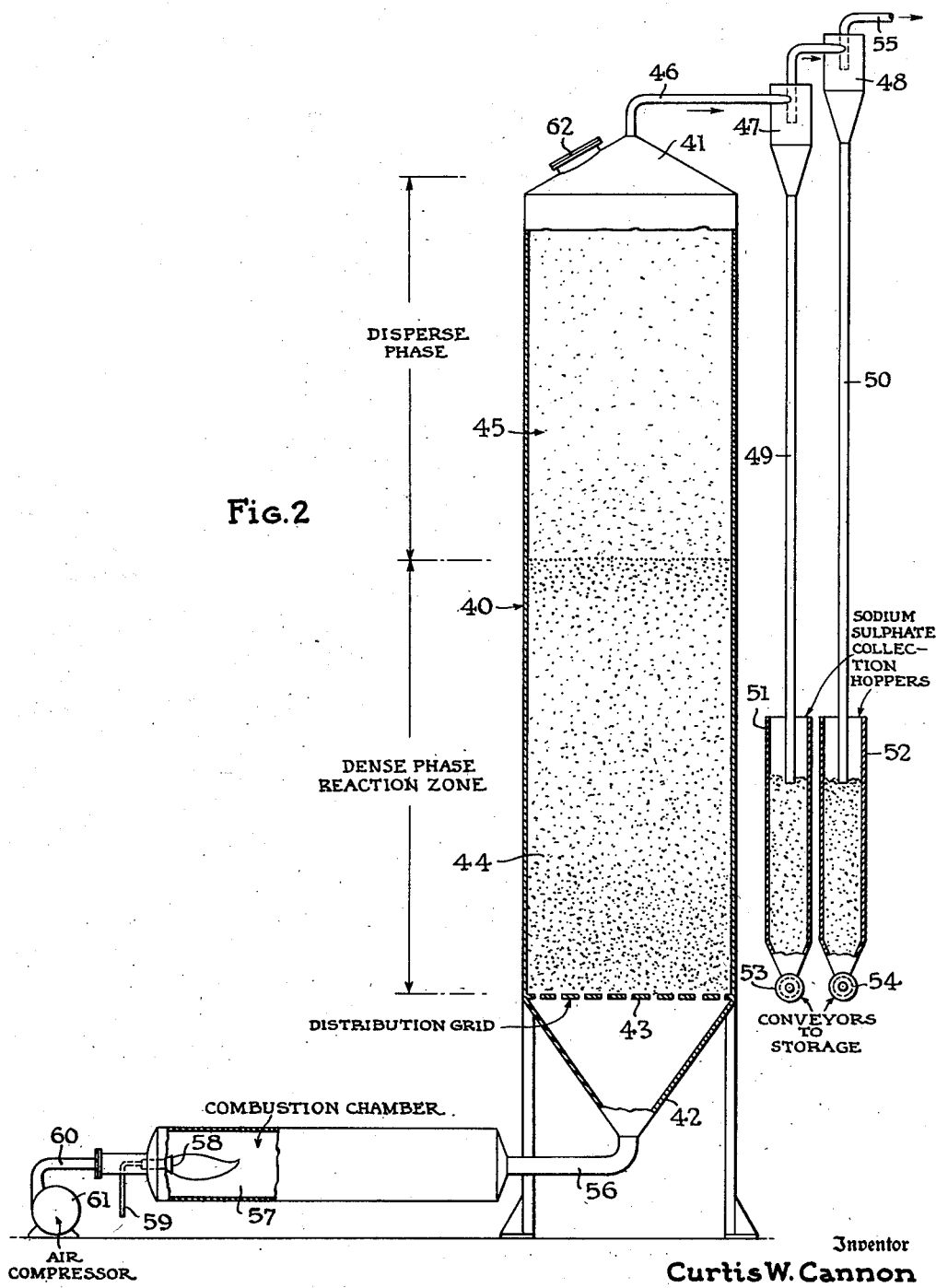

United States Patent Office 2,706,144
Patented Apr. 12, 1955

2,706,144

IMPROVED HARGREAVES METHOD FOR MAKING SULPHATE SALTS AND HCl

Curtis W. Cannon, Denver City, Tex.

Application February 2, 1950, Serial No. 142,035

7 Claims. (Cl. 23—121)

This invention relates to an improved Hargreaves process and apparatus therefor, for the production of hydrochloric acid and sulphate salts of the character of sodium, potassium, calcium, etc. The reaction is effected upon a bed of solid salts, maintained in an agitated state of fluidity by pressure of reagent gases passed therethrough.

The typical Hargreaves process is identified in the following equation:

(1) $\quad 2NaCl + SO_2 + \frac{1}{2}O_2 + H_2O \rightarrow Na_2SO_4 + 2HCl$ and is known to go to substantial completion in the range of 800° to 1100° F. It is most commonly carried out commercially by passing a mixture of sulphurous combustion gases, excess air, and steam through a series of chambers containing briquettes of salt.

The reaction may be considered to occur in two steps.

(2) $\quad NaCl + SO_2 + \frac{1}{2}O_2 + H_2O \rightarrow NaHSO_4 + HCl\uparrow$
(3) $\quad NaCl + NaHSO_4 \rightarrow Na_2SO_4 + HCl\uparrow$ This high reaction temperature is essential to substantially complete Reaction 3 and produce sodium sulphate sufficiently acid and chloride free to meet the requirements of commerce. Since the reaction is reversible, the gaseous hydrogen chloride must be removed from the sodium sulphate at substantially reaction temperature.

A further reaction that may occur as the result of overconversion is (4) $\quad Na_2SO_4 + SO_2 + \frac{1}{2}O_2 + H_2O \rightarrow 2NaHSO_4$ which produces sodium acid sulphate as does Reaction 2, which tends to prevail at temperatures below the customary 800° to 1100° F. reaction temperature. Since the sodium acid sulphate has a fusion point below this desired reaction temperature, its presence as the result of Reaction 2 or 4 must be maintained at a minimum if stickiness, blocking of interstices, imperviousness, agglomeration, and consequent poor contact of salt with the reacting gases are avoided. Moreover the reaction temperature must be carefully held with respect to its upper range to avoid fusion of the salts and their eutectic mixtures.

It is generally accepted that the conventional application of the Hargreaves process, using a series of ovens and briquettes, represents a costly installation and expensive operation both from the standpoint of labor and fuel. The reaction must be carried out over a period of days or weeks, necessitating a large installation for the tonnage of salt converted, and operated at carefully controlled conditions to avoid undue stickiness of the briquettes and incomplete reaction.

Methods have been proposed to avoid the briquetting by reacting the sulphurous gases with sodium chloride vapor or injecting fine relatively cool salt particles into the sulphurous gases at temperatures in the range of 1450° to 2000° F., thus shattering the salt particles into a dust which reacts instantaneously under the conditions producing simultaneously gaseous HCl and a substantially gaseous sulphate fume. Neither of these methods has been accepted by industry, possibly due to the difficulties of collecting a fume like sulphate product or the increased equipment maintenance and fuel costs resulting from operation at these higher temperatures. Carrying out the reaction counter-currently by passing the salt downward and gas upward has been proposed, but never attained commercial status.

The present method and apparatus are adapted to either batchwise or continuous operation with substantial simplification of the equipment, operation, labor, and maintenance required for carrying out the Hargreaves process as compared to the present industry practice. Commercially available granular salt is used, avoiding the necessity of briquetting.

The reaction is completed in a matter of hours in the normal Hargreaves temperature range without encountering objectionable stickiness, caking, or fusion, and produces an easily recoverable powder-like product.

According to the present invention a dry granular bed of alkali-forming metal chlorides is maintained at the reaction temperature in a turbulent state of agitation by the upward flow of Hargreaves reagent gases under conditions regulated to effect reaction to completion and classify and remove the reaction product. A critical feature of the present invention is that the bed of particulate salt undergoing reaction, is carefully balanced in a stream of reagent gases which are passed upwardly therethrough at a rate and under sufficient pressure to maintain the particles in a state of continued agitation and thereby of substantial fluidity. The flow of gas and the size of the particles are so regulated and chosen as to continuously agitate and abrade the particle salt surface by rubbing one against the next, whereby the reaction product, such as alkali metal sulphate film about each particle, is continuously and selectively removed by abrasion and substantially converted thereby to a finer dust which becomes classified by entrainment in the upward gas flow. The reagent gas stream as well as hydrochloric acid produced in substantial concentration therein, is passed through the bed at a rate sufficient to entrain and float the finer dust particles of sulphate out of the apparatus continuously or batchwise to dust separators.

It has been demonstrated that the method will permit the selective classification and entrainment of the sodium sulphate product throughout various stages of conversion of the reactor bed, by proper selection of operating conditions. A critical requirement for successful operation, other than proper choice of gas velocity-chloride salt particle size relationship, is preheating of the chloride salt to the reaction temperature range prior to contacting with reagent gases. A further beneficial factor in producing low chloride content sodium sulphate is completion of the reaction as rapidly as possible by feeding maximum concentration of reagent gases.

The following explanation may serve in part to explain the successful operation of the method, but is not intended to limit the scope of the patent.

It is known that reaction temperatures in the order of 800° to 1100° F. are required to secure completion of the reaction to neutral sulphate. It is also known that at lower temperatures substantial amounts of the acid sulphate remain as illustrated in Reaction 2. Further, in carrying out the reaction on stationary large particles, lumps or briquettes, the acid sulphate may be formed at the reacting surfaces due to localized over-conversion according to Reaction 4, even though reaction temperatures sufficient to convert the neutral acid sulphate are maintained. In any event this acid sulphate salt is fused and tends to coat the reacting surfaces, pores, etc., thus retarding rapid diffusion and contact of the reacting gas and causing stickiness, agglomeration and similar undesirable properties of the reacting salts. Constant abrasion and selective entrainment of sodium sulphate by the method herein described constantly presents fresh surfaces of the chloride salt, so that localized over-conversion is substantially absent. Further, preheating of the salt particles to reaction temperature before contact with reagent gases eliminates the warm-up period, during which significant amounts of the pasty acid sulphate must exist. Preheating of the salt before contacting the reacting bed also eliminates the thermal shock and consequently minimizes creation of fine sodium chloride dust or fume, which would carry over and contaminate the entrained sodium sulphate. Selective elutriation and entrainment of sodium sulphate from the sodium chloride bed is evidently due to the smaller particle size and other pertinent physical characteristics of the sodium sulphate formed as compared to the reacting chloride salt. Using the technique described, abrasion and attrition of the salt particles themselves occur, but apparently with considerable less ease than the abrading of the sulphate salt, which permits the selective classification and entrainment of commercially chloride free sodium sulphate. Since attrition and entrainment of the sodium chloride fines proceeds constantly, without the presence of reagent components in the "fluidizing" gas stream, it appears logical and is borne out by experiment that the conversion of the salt particles must be achieved as rapidly as possible to minimize the ratio of sodium chloride to sodium sulphate produced as elutriated fines.

According to the present method preheating of the salt is accomplished by contacting the salt particles with hot gases, such as combustion or product gases, in a kiln or by passing the gases through the granular bed. Thereafter the Hargreaves reagent gases, consisting of sulphur dioxide, oxygen, and water vapor plus inert gases—principally nitrogen—introduced with the air used in burning the sulphur and supplying the required oxygen, are passed upwardly through the granular bed to agitate and react with same.

It will be understood from chemical engineering considerations that combustion of sulphur, as well as the Hargreaves reaction itself, is exothermic and can supply sufficient and even an excess of heat to maintain critical reaction temperatures. Further the preheating of salt also supplies heat to the process. Other factors can work to lower the reactor temperature, such as the supply of excess air, introduction of moisture as mist instead of steam, supplying cool sulphur dioxide instead of using the direct, hot, sulphurous combustion products, heat loss by radiation, convection, and exchange, etc. It will also be recognized by persons skilled in chemical engineering that minimizing the amount of nitrogen in the system will simplify the absorption of hydrochloric acid as well as accelerate reaction. Further the preheating of salt makes possible the introduction of all or part of the reagent gases in substantially pure form, thus eliminating a corresponding amount of nitrogen incident to the typical Hargreaves process. It is foreseen that with present engineering developments permitting separation economically of sulphur dioxide and oxygen from nitrogen that the Hargreaves reagent gases may preferably be used in concentrated form to achieve the elimination of all or a substantial portion of the nitrogen normally present in Hargreaves gases. The benefits of preheating salt, ease of maintaining uniform reaction temperature in a fluidized bed, and the operability of the process at accelerated reaction rates adapt it to the use of concentrated reagent gases, with attendant benefits. Heat removal or addition to maintain desired reaction temperature, as needed for the particular case, can be handled in accordance with customary chemical engineering practices.

In event the bed temperature tends to rise above the desirable reaction temperature, as will be the case when sulphur is burned in air to yield stoichiometric proportions, temperature can be maintained within the desired reaction range by injecting necessary water as a mist into the air or combustion gas stream, reducing salt feed preheat, or removing excess heat from the bed by heat exchange through the vessel walls or tubular type exchange equipment. The bed will be found to remain at uniform temperature throughout because of the turbulent movement of the particles. The combustion is desirably effected under pressure, conveniently supplied by an air compressor connected to the burners, so that the combustion gases are supplied to the reaction bed at a desired rate and pressure, but the method can be employed using induced draft so that the system is under slight vacuum.

In continuous operation, as the bed is continuously being converted to sulphate, new salt is introduced at the bottom thereof suitably preheated to reaction temperature. It is possible, however, that the salt added at the bottom of the bed may be fed as a slurry of salt in water or a concentrated brine, preheated to the boiling point or superheated to allow most of the steam to flash-off, and the excess heat requisite for evaporation of the moisture in such salt will be supplied by the burner suitably regulated to this end. However, it is preferable to supply dry preheated salt.

The apparatus

Fig. 2 shows an apparatus suitable for batchwise operation.

Figure 1:
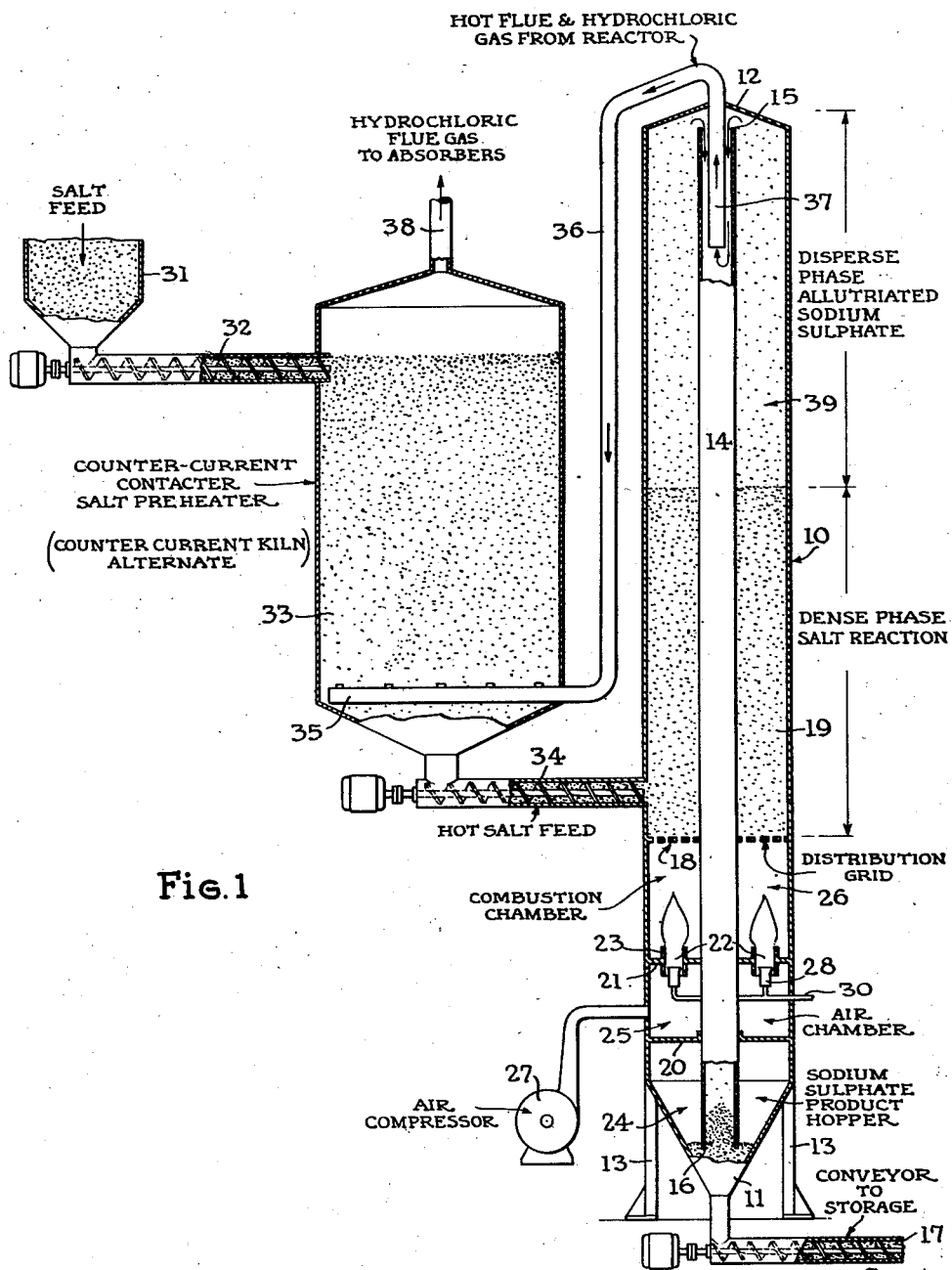
Fig. 1 shows an apparatus for effecting this process continuously.

For continuous operation as indicated in Fig. 1, the reaction chamber is a vertical column 10, preferably cylindrical to be pressure resistant, for heat economy and easy maintenance, having a conical bottom 11 and top 12 of any curved pressure resistant shape. The column 10 is supported on legs 13 in a vertical position and has, concentric therewith, an internal duct 14 comprising a tube, open both at the top 15 for reception of the effluent gas stream and fine sulphate salt carried thereby and open at the bottom 16 for depositing trapped sulphate dust in the conical bottom 11. The conical bottom 11 communicates with any suitable screw type conveyor 17 for removing accumulated sulphate salt and for conveying the same to storage, while maintaining the system sealed against effluence of gases under pressure.

At a substantial distance above the bottom of the column, is a perforated plate 18 forming a distribution grid for simultaneously supporting a bed of salt 19 thereabove and allowing passage of gas upwardly therethrough. A lower imperforate plate 20 parallel to the grid 19 is mounted above the conical bottom to seal the same and form a closed hopper for reception of deposited sulphate therebeneath. Intermediate the plate 20 and the grid 18 is a third plate 21 having large openings 22 forming tuyères, each bonded by slightly extended thimbles or tubes 23 rising slightly above plate 21 to form pockets on said plate 21 to receive any sodium chloride dust that might have fallen through the grid plate 18 and direct the air to the combustion zone of the burner. With this construction, the section beneath the salt bed 19 is divided into a series of chambers, the lowermost 24 being a sealed hopper, an air supply reception chamber 25 thereabove, and a combustion chamber 26 directly beneath the grid for combustion zone mixing of the gases, and supplying the same at an even pressure to the grid plate 18 and thence upwardly through the bed 19.

Communicating with the gas chamber 25 is an air compressor 27 which supplies air under adequate pressure in order to fluidize the particles in the bed and supply gas at a rate sufficient to keep the particles in a state of agitation while passing gas therethrough. Also communicating with said chamber 25 are fuel and sulphur burners 28 comprising conventional jet burners to which sulphur vapor or sulphurous gas fuels are supplied under pressure by line 30. The complete details of the fuel and sulphur burners are not shown, and if desired may be of conventional construction separate from the reaction vessel, in which case the burning and air supply would be to the separate pressure burner and the reagent gases piped to the reactor bed bottom under pressure. However the process lends itself to the very simple construction indicated.

The burners may receive a supply of steam if necessary from an extra line or the fuel itself may supply water which is converted into steam during combustion. Alternatively steam may be supplied directly below the reactor bed by a line (not shown) that is connected with a steam boiler or other suitable source. The simple combustion of hydrogen sulphide produces water vapor and sulphur dioxide in proper stoichiometric proportions and is a very convenient fuel to use with conventional gas burners.

To maintain continuous operation granular salt is fed from a hopper 31 into a conventional screw conveyor 32. The latter discharges into the heat exchanger 33, and the salt, after acquiring heat in exchanger 33 passes to a hot salt screw conveyor 34 from which it is discharged into or near the bottom of the salt bed 19. The salt may be heated by various means and may itself be hot salt slurry or crude salt formed in a vacuum pan salt drying system. Or, it may be brine injected directly into the bottom of the hot salt bed 19 which is supplied with sufficient heat to balance that required for evaporation of the moisture content thereof. However, it is preferred to use salt which is preheated by heat exchange from effluent hydrochloric acid-containing flue gases of the process. The effluent gases as shown are supplied in counter current contact to the salt through a screen of perforated pipes 35 at the bottom of the heat exchanger 33, the effluent gases being passed directly by a line 36 from the top of the reactor 10. The line 36 leads from a concentric tube 37 suspended within the tube 14, the concentrically arranged tubes 14 and 37 acting as a baffle for separating entrained sulphate dust from the effluent gases. The separated dust drops to the bottom 16 of tube 14 and thence into the hopper 24, while the effluent gases, substantially free of sulphate dust pass through the tube 37 and pipe 36, for heat exchange with the salt in the exchanger 33. The effluent gases pass out from the exchanger 33 by a line 38 to conventional absorbers and washers, in order to remove hydrochloric acid therefrom.

As indicated in Fig. 1 the salt bed 19 comprises a dense phase maintained in agitation by the gas surging upwardly therethrough, at a controlled rate. The chloride salt particles of the bed should be large enough to prevent substantial carry-over for the chosen operating velocity, so that they will not be substantially entrained. The finer dustlike sulphate particles will be entrained by the gas and carried upward through an open space zone 39 as a disperse phase in the reactor, and thence through the baffling zone formed by the tubes 14 and 37. The granular salt bed may be of 100 mesh or larger grain size. Excellent results are obtained with table salt size grains. The granules of the bed will be agitated by the gas stream passing upwardly at a velocity of the order of 1 to 5 feet per second. The bed may vary in depth from 10 to 20 feet for a gas flow at this rate, and the disperse phase or portion above the bed should be from 10 to 15 feet in height. Alternately or in addition cyclone separators, filters etc. may be inserted in line 36 but internal tubular type separators as shown have the advantage of separating the sulphate salts from the hydrochloric gas at reaction temperature, thus preventing reversal of reaction.

In operation of the process continuously according to Fig. 1, the bed is charged with salt and preheated by passing ordinary flue gases therethrough to raise the bed temperature to the range of 800° to 1100° F. (the temperature requisite for the Hargreaves reaction), or may be somewhat higher. In order to bring incoming salts to this reaction range and evaporate any moisture therein, the temperature may be considerably higher than this up to 1500° F. but it is undesirable to raise the temperature above that at which the salt or impurities therein will fuse.

Thereafter, sulphur, or oxidizable compounds thereof, is simultaneously burned with the fuel and sufficient oxygen is supplied thereto to a stoichiometric content in the flue gases to that required for reaction. Thus the flue gas content of sulphur dioxide, oxygen and water vapor, will be that necessary to react according to Equation 1 above.

The velocity of the gas as indicated, of the order of 1 to 5 feet per second, is sufficient to maintain a bed from 10 to 20 feet in depth in a desirably fluid and well agitated condition. It will be appreciated, however, that such velocity of gas passing through the small grid openings is considerably greater, and may range from 100 to 500 feet per second through such openings. This velocity is sufficient to prevent salt in the bed from dropping through these grid openings. This rate of passage of gas will agitate the bed, abrasively. This agitation and upward gas movement is effective to abrade and remove particles of sulphate formed by reaction as a dust from the salt, and to carry the fine sulphate dust overhead through the disperse phase of the reaction chamber. After mechanical separation at the top of the chamber, it falls through pipe 14 into the hopper 24. However, such rate of passage of the gases as indicated, is so regulated as not to entrain the salt particles themselves, of larger granular character.

The hydrochloric acid gas is produced continuously as the sulphurous reagents contact the salt bed, and can be produced in concentrations approaching theoretical maximum. Moreover, the sulphate produced is a substantially uniform pure dry powder. Operating with sodium chloride as the granular bed material, an entrained product of 95 to 98.1 purity can be produced, even when the salt bed itself is substantially chloride salt.

The apparatus for batchwise operation, as shown in Fig. 2, comprises an upright cylindrical tank 40 having a dished or conical pressure resistant top 41, and a conical bottom 42. Mounted horizontally above the conical bottom within the tank is a perforated distribution grid plate 43 which is adapted to support a bed of salt 44 while passing gas upwardly therethrough from the conical bottom 42. The bed comprises a dense phase of salt 44 and a disperse phase of sulphate dust and effluent gas 45 thereabove. When fine sulphate is classified from entrained salt the acid gas produced and sulphate dust carried thereby are carried overhead through an effluent line 46 and thence into a series of cyclones 47 and 48, the sulphate dust being deposited, by gravity, therefrom through legs 49 and 50 into receiving hoppers 51 and 52. Suitable screw conveyors 53 and 54 are provided to convey the sulphate dust to storage, not shown. The hot hydrochloric acid-containing flue gases pass from the top of cyclones through a line 55 to acid absorbers and washers of conventional construction, not shown.

Gases are supplied to the conical bottom 42 through a pipe 56 leading from combustion chamber 57 in which is mounted a fuel burner 58 to which fuel, containing sulphur or sulphur compounds capable of oxidation to sulphur dioxide, is supplied from a source 59. The combustion chamber also is connected with a compressed air duct 60 for supplying air under pressure for combustion, and additional air for reaction and control of the rate, quantity and pressure of gases supplied from air compressor 61.

This system differs from that described for the continuous system of Fig. 1 in that the bed of granular salt 44 is first established, preheated, and then reacted, but it is not replenished as reaction proceeds nor changed until substantial exhaustion. The pressure supplied by the air compressor is controlled to maintain constant flow rate as the bed of salt is converted to sulphate and hydrochloric acid, as the reaction proceeds. After the bed has been substantially reacted the operation is discontinued, and the salt bed replenished by addition of more salt thereto through an opening 62 at the top of the tank 40.

Again, depending upon the height of the salt bed, which may range from 10 to 20 feet, and with an open space thereabove for separation and classification of the sulphate therein which may be 10 to 15 feet, the gas may be passed through at a rate of the order of 1 to 5 feet per second. At this rate, with a substantially deep bed, sulphate dust is entrained and carried over to the separators 47 and 48. However, operating at a considerably reduced rate, as low as .3 foot per second, all of the sulphate will not be entrained but eventually be converted in place, and can be removed when the reaction is completed. In operation of the batch process, the salt should preferably first be preheated, e. g., by flue gas to the operating temperature range or above 800° to 1100° F. and thereafter sulphur dioxide producing sulphur compounds or sulphur will be introduced as the fuel for combustion and the reaction will be allowed to proceed to produce sulphate according to the Hargreaves reaction.

It will be noted that in each case the gas is passed at a rate sufficient to produce a desired turbulence, abrasion or fluidity of bed particles, and to effect the classification and upward movement of sulphate as dust particles, as formed. However, it is preferred to operate at a rate sufficient to entrain the sulphate particles for overhead removal thereof by the cyclone dust collectors. In this batch process, as for the continuous process, highly purified sulphate dust is obtained substantially free of bisulphate and contaminating salts.

Operating examples

*Example I.*—In a typical batchwise operation according to the present invention, an apparatus, as described in Fig. 2 was set up wherein the reaction chamber is approximately 32 feet high and 1½ feet in diameter with a grid plate separating the bottom forming a plenum chamber through which Hargreaves gases were forced. A granular bed of table salt, sodium chloride, having a mesh size averaging 120 mesh, screened to eliminate particles below 100 mesh, is filled to a height of 15 feet above the grid plate. Combustion of gaseous fuel was begun in the burners and passed through the bed at a rate of three feet per second, setting up agitation and turbulence in the bed for a period of about three hours until the temperature of the bed was homogenous throughout at about 1100° F. Thereafter combustion of sulphur was begun in the burners using ordinary air with a slight addition of moisture and the temperature of the bed regulated by increasing or decreasing the quantity of moisture added to the vapors, the temperature of the bed being held to an average throughout the run of 1050° F., and the gas rate of flow being maintained substantially constant at about three feet per second. Sodium sulphate was continuously entrained and separated outside the column in cyclone separators, and collected in dust hoppers. The reaction gases were found to contain an average of 18% of hydrochloric acid, the sodium sulphate obtained was found to be 97.5% sodium sulphate and the bed was found to be reduced in the batch operation to a height of two feet after 20 hours of operation.

*Example II.*—The reaction as described in Example I, was carried upon an apparatus as shown in Fig. 1 with similar preheating of the bed and with the modification that the reaction maintained continuously over a period of two weeks with continuous feeding of salt preheated to 1100° F. to the bottom of the bed by a screw conveyor. The sodium sulphate obtained was substantially of the same purity, 97.1% pure.

As thus described a bed of granular salt (for example sodium chloride) is substantially fluidized and converted to a state of abrasive turbulence by passing gas therethrough under pressure at a rate sufficient to maintain such turbulent state while heating the same to Hargreaves reaction temperature, such gas containing the required reagents for reacting with the fluidized bed. The abrasive turbulence continuously abrades reaction product of fine sulphate, in dust form, and with the hydrochloric gas produced, both are separated continuously from the bed, the finer dustlike particles of the sulphate reaction product being entrained in the gases. The sulphate may be entrained to a degree to carry the same out of the apparatus for trapping in cyclone dust separators. Alternatively, the gas flow can be held to a rate sufficiently low to permit the product to remain in the reactor until essentially complete conversion is attained. But it is preferred to strip the sulphate from the salt particles so that the chloride salt is more thoroughly exposed for reaction.

By this process it is apparent that the bed may be heated hot enough for complete Hargreaves reaction to take place, without the formation of low fusible bi-sulphate. The reaction may be effected at a reasonably high rate so that the equipment is not necessarily bulky or expensive. The method and apparatus lends itself to ease of handling of the materials, producing substantially pure products resulting in considerable labor-saving. There is no local overheating and thereby sticking of particles to the apparatus in spots, as in former methods; the form of apparatus can be pressure tight, fully insulated, and adapted to conventional methods of heat conservation and exchange.

Moreover, the process lends itself to both intermittent, or continuous operation with attendant saving of heat losses. Finally, it is unnecessary to use excessively high temperatures for evaporation of salt. While the apparatus hereof may be ordinary steel or iron, where great purity of the product is not essential, the purity may be maintained by use of known construction materials, such as corrosion-resistant alloys and ceramic lining.

It will be appreciated that the term sulphate herein refers to any of the alkali metal or alkali earth metal sulphates that may be formed with the Hargreaves type process such as sodium sulphate, potassium sulphate or calcium sulphate and that the bed, while generally referred to as ordinary salt or chloride salt can be sodium chloride, potassium chloride, or other alkaline metal chlorides capable of processing by the Hargreaves reaction.

Finally, it is to be noted that the sulphate as produced is abraded from and removed, by suspension, as a fine dust. It is not fused in the process. It is possible therefore that the salt of the bed may be treated with a reagent to be entrained with and homogeneously deposited in sulphate. For example, various catalysts may be added to the salt of the acid for ultimate entrainment with the sulphate.

As thus described, various modifications will occur to those skilled in the art. The foregoing description is intended to be merely illustrative, and not limiting except as defined in the claims appended hereto.

I claim:
1. The method of reacting metal chloride selected from the group consisting of sodium, potassium and calcium, with reaction gases containing sulphur dioxide, water vapor, and oxygen to produce metal sulphate selected from the group consisting of sodium, potassium and calcium comprising fluidizing a bed of finely divided metal chloride at elevated reaction temperature by passing hot reaction gases upwardly therethrough at a rate of approximately 1 to 5 feet per second whereby said gases react with said chloride to produce metal sulphate reaction product on the surface of said chloride, the rate of passage of said gases producing substantial abrasive contact of one particle with the next to selectively abrade, entrain, and remove abraded reaction product from an upper portion of said bed as a fine dust.

2. The method in accordance with claim 1 where the metal chloride is heated to reaction temperature prior to entering the fluidized bed.

3. The method in accordance with claim 1 wherein at least a portion of the gases removed from the fluidized bed is recycled in admixture with said gases passing upwardly through the bed.

4. The method in accordance with claim 1 where the metal chloride is sodium chloride.

5. The method of reacting metal chloride selected from the group consisting of sodium, potassium and calcium with reaction gases containing sulphur dioxide, water vapor, and oxygen to produce metal sulphate selected from the group consisting of sodium, potassium and calcium comprising fluidizing a bed of finely divided metal chloride at reaction temperature in excess of about 800 degrees F., by passing hot reaction gases upwardly therethrough at a rate of approximately 1 to 5 feet per second whereby said gases react with said chloride to produce metal sulphate reaction product on the surface of said chloride, the rate of passage of said gases producing substantial abrasive contact of one particle with the next to selectively abrade, entrain, and remove abraded reaction product from an upper portion of said bed as a fine dust.

6. The method in accordance with claim 5 where the metal chloride is sodium chloride.

7. The method in accordance with claim 5 where the metal chloride is sodium chloride and the sodium chloride is preheated to a temperature in excess of about 800 degrees F., prior to entering the fluidized bed.

References Cited in the file of this patent

UNITED STATES PATENTS

| | | |
|---|---|---|
| 1,984,380 | Odell | Dec. 18, 1934 |
| 1,987,552 | Fauser | Jan. 8, 1935 |
| 2,089,957 | Harris et al. | Aug. 17, 1937 |
| 2,336,180 | Lippman, Jr. et al. | Dec. 7, 1943 |
| 2,469,989 | Pyzel | May 10, 1949 |
| 2,480,639 | Ferguson | Aug. 30, 1949 |
| 2,600,253 | Lutz | June 10, 1952 |

FOREIGN PATENTS

| | | |
|---|---|---|
| 513,947 | Great Britain | Oct. 26, 1939 |

OTHER REFERENCES

Manufacture of Acids and Alkalis, Lunge and Cumming, vol. V.

Hydrochloric Acid and Salt Cake, A. C. Cumming, pages 196-215.